(12) United States Patent
Svilan et al.

(10) Patent No.: US 7,949,864 B1
(45) Date of Patent: May 24, 2011

(54) BALANCED ADAPTIVE BODY BIAS CONTROL

(76) Inventors: Vjekoslav Svilan, Mountain View, CA (US); James B. Burr, Foster City, CA (US)

( * ) Notice: Subject to any disclaimer, the term of this patent is extended or adjusted under 35 U.S.C. 154(b) by 564 days.

(21) Appl. No.: 11/238,446

(22) Filed: Sep. 28, 2005

Related U.S. Application Data

(63) Continuation-in-part of application No. 10/334,918, filed on Dec. 31, 2002.

(51) Int. Cl.
*G06F 1/32* (2006.01)
*G06F 1/24* (2006.01)

(52) U.S. Cl. ............ 713/1; 713/100; 713/300; 713/310; 713/320; 713/321; 713/322; 713/323; 713/324; 713/330; 713/340; 326/36

(58) Field of Classification Search .................. 713/1, 2, 713/100, 300, 310, 320–324, 330, 340; 326/36
See application file for complete search history.

(56) References Cited

U.S. PATENT DOCUMENTS

| | | |
|---|---|---|
| 4,335,445 A | 6/1982 | Nercessian |
| 4,679,130 A | 7/1987 | Moscovici |
| 4,739,252 A | 4/1988 | Malaviya et al. |
| 4,893,228 A | 1/1990 | Orrick et al. |
| 5,086,501 A | 2/1992 | DeLuca et al. |
| 5,103,110 A | 4/1992 | Housworth et al. |
| 5,167,024 A | 11/1992 | Smith et al. |
| 5,201,059 A | 4/1993 | Nguyen |
| 5,204,863 A | 4/1993 | Saint-Joigny et al. |
| 5,218,704 A | 6/1993 | Watts, Jr. et al. |
| 5,230,055 A | 7/1993 | Katz et al. |
| 5,239,652 A | 8/1993 | Seibert et al. |
| 5,410,278 A | 4/1995 | Itoh et al. |
| 5,422,591 A | 6/1995 | Rastegar et al. |
| 5,422,806 A | 6/1995 | Chen et al. |
| 5,440,520 A | 8/1995 | Schutz et al. |
| 5,461,266 A | 10/1995 | Koreeda et al. |
| 5,502,838 A | 3/1996 | Kikinis |
| 5,511,203 A | 4/1996 | Wisor et al. |
| 5,513,152 A | 4/1996 | Cabaniss |
| 5,519,309 A | 5/1996 | Smith |
| 5,560,020 A | 9/1996 | Nakatani et al. |

(Continued)

FOREIGN PATENT DOCUMENTS

EP 0381021 8/1990

(Continued)

OTHER PUBLICATIONS

Baker, K. et al., "SHMOO Plotting: The Black Art of IC Testing", IEEE Design and Test of Computers, IEEE vol. 14, No. 3, Jul. 1, 1997, pp. 90-97, XP000793305, ISSN: 0740-7475.

(Continued)

*Primary Examiner* — Thomas Lee
*Assistant Examiner* — Fahmida Rahman

(57) ABSTRACT

Systems and methods of balanced adaptive body bias control. In accordance with a first embodiment of the present invention, a method of balanced adaptive body bias control comprises determining a desirable dynamic condition for circuitry of an integrated circuit. A first dynamic indicator corresponding to the desirable dynamic condition is accessed. Second and third dynamic indicators of the integrated circuit are accessed. A first body biasing voltage is adjusted by an increment so as to change the first dynamic indicator in the direction of the desirable dynamic condition. A second body biasing voltage is adjusted based on a relationship between the second dynamic indicator and the third dynamic indicator.

40 Claims, 2 Drawing Sheets

U.S. PATENT DOCUMENTS

| | | | |
|---|---|---|---|
| 5,568,103 | A | 10/1996 | Nakashima et al. |
| 5,592,173 | A | 1/1997 | Lau et al. |
| 5,594,360 | A | 1/1997 | Wojciechowski |
| 5,610,533 | A | 3/1997 | Arimoto et al. |
| 5,680,359 | A | 10/1997 | Jeong |
| 5,682,093 | A | 10/1997 | Kivela |
| 5,692,204 | A | 11/1997 | Rawson et al. |
| 5,717,319 | A | 2/1998 | Jokinen |
| 5,719,800 | A | 2/1998 | Mittal et al. |
| 5,727,208 | A | 3/1998 | Brown |
| 5,745,375 | A | 4/1998 | Reinhardt et al. |
| 5,752,011 | A | 5/1998 | Thomas et al. |
| 5,754,869 | A | 5/1998 | Holzhammer et al. |
| 5,757,171 | A | 5/1998 | Babcock |
| 5,764,110 | A | 6/1998 | Ishibashi |
| 5,778,237 | A | 7/1998 | Yamamoto et al. |
| 5,796,313 | A | 8/1998 | Eitan |
| 5,812,860 | A | 9/1998 | Horden et al. |
| 5,815,724 | A | 9/1998 | Mates |
| 5,815,725 | A | 9/1998 | Feierbach |
| 5,825,674 | A | 10/1998 | Jackson |
| 5,848,281 | A | 12/1998 | Smalley et al. |
| 5,880,620 | A | 3/1999 | Gitlin et al. |
| 5,884,049 | A | 3/1999 | Atkinson |
| 5,894,577 | A | 4/1999 | MacDonald et al. |
| 5,923,545 | A | 7/1999 | Nguyen |
| 5,933,649 | A | 8/1999 | Lim et al. |
| 5,940,785 | A | 8/1999 | Georgiou et al. |
| 5,940,786 | A | 8/1999 | Steeby |
| 5,973,526 | A | 10/1999 | Dabral |
| 5,974,557 | A | 10/1999 | Thomas |
| 5,977,763 | A | 11/1999 | Loughmiller et al. |
| 5,996,083 | A | 11/1999 | Gupta et al. |
| 5,996,084 | A | 11/1999 | Watts |
| 6,011,403 | A | 1/2000 | Gillette |
| 6,035,407 | A | 3/2000 | Gebara et al. |
| 6,047,248 | A | 4/2000 | Georgiou et al. |
| 6,048,746 | A | 4/2000 | Burr |
| 6,055,655 | A | 4/2000 | Momohara |
| 6,078,319 | A | 6/2000 | Bril et al. |
| 6,087,892 | A | 7/2000 | Burr |
| 6,091,283 | A | 7/2000 | Murgula et al. |
| 6,091,300 | A | 7/2000 | Setty et al. |
| 6,097,242 | A | 8/2000 | Forbes et al. |
| 6,118,306 | A | 9/2000 | Orton et al. |
| 6,119,241 | A | 9/2000 | Michail et al. |
| 6,141,762 | A | 10/2000 | Nicol et al. |
| 6,172,943 | B1 | 1/2001 | Yuzuki |
| 6,202,104 | B1 | 3/2001 | Ober |
| 6,216,235 | B1 | 4/2001 | Thomas et al. |
| 6,218,708 | B1 | 4/2001 | Burr |
| 6,218,892 | B1 | 4/2001 | Soumyanath et al. |
| 6,218,895 | B1 | 4/2001 | De et al. |
| 6,229,747 | B1 | 5/2001 | Cho et al. |
| 6,232,793 | B1 | 5/2001 | Arimoto et al. |
| 6,232,827 | B1 | 5/2001 | De et al. |
| 6,242,936 | B1 | 6/2001 | Ho et al. |
| 6,272,642 | B2 | 8/2001 | Pole, II et al. |
| 6,279,048 | B1 | 8/2001 | Fadavi-Ardekani et al. |
| 6,303,444 | B1 | 10/2001 | Burr |
| 6,304,824 | B1 | 10/2001 | Bausch et al. |
| 6,311,287 | B1 | 10/2001 | Dischler et al. |
| 6,314,522 | B1 | 11/2001 | Chu et al. |
| 6,341,087 | B1 | 1/2002 | Kunikiyo |
| 6,345,363 | B1 | 2/2002 | Levy-Kendler |
| 6,347,379 | B1 | 2/2002 | Dai et al. |
| 6,378,081 | B1 | 4/2002 | Hammond |
| 6,388,432 | B2 | 5/2002 | Uchida |
| 6,392,467 | B1 | 5/2002 | Oowaki et al. |
| 6,407,571 | B1 | 6/2002 | Furuya et al. |
| 6,411,156 | B1 | 6/2002 | Borkar et al. |
| 6,415,388 | B1 | 7/2002 | Browning et al. |
| 6,422,746 | B1 | 7/2002 | Weiss et al. |
| 6,425,086 | B1 | 7/2002 | Clark et al. |
| 6,426,641 | B1 | 7/2002 | Koch et al. |
| 6,427,211 | B2 | 7/2002 | Watts, Jr. |
| 6,442,746 | B1 | 8/2002 | James et al. |
| 6,456,157 | B1 | 9/2002 | Forbes et al. |
| 6,457,134 | B1 | 9/2002 | Lemke et al. |
| 6,457,135 | B1 | 9/2002 | Cooper |
| 6,466,077 | B1 | 10/2002 | Miyazaki et al. |
| 6,476,632 | B1 | 11/2002 | La Rosa et al. |
| 6,477,654 | B1 | 11/2002 | Dean et al. |
| 6,484,265 | B2 | 11/2002 | Borkar et al. |
| 6,487,668 | B2 | 11/2002 | Thomas et al. |
| 6,489,224 | B1 | 12/2002 | Burr |
| 6,489,796 | B2 | 12/2002 | Tomishima |
| 6,510,400 | B1 | 1/2003 | Moriyama |
| 6,510,525 | B1 | 1/2003 | Nookala et al. |
| 6,513,124 | B1 | 1/2003 | Furuichi et al. |
| 6,518,826 | B2 | 2/2003 | Zhang |
| 6,519,706 | B1 | 2/2003 | Ogoro |
| 6,574,739 | B1 | 6/2003 | Kung et al. |
| 6,614,301 | B2 | 9/2003 | Casper et al. |
| 6,621,325 | B2 | 9/2003 | Hart et al. |
| 6,653,890 | B2 | 11/2003 | Ono et al. |
| 6,657,504 | B1 | 12/2003 | Deal et al. |
| 6,731,157 | B2 | 5/2004 | Fulkerson |
| 6,777,978 | B2 | 8/2004 | Hart et al. |
| 6,784,722 | B2 | 8/2004 | Tang et al. |
| 6,792,379 | B2 | 9/2004 | Ando |
| 6,794,630 | B2 | 9/2004 | Keshavarzi et al. |
| 6,812,758 | B2 | 11/2004 | Gauthier et al. |
| 6,815,971 | B2 | 11/2004 | Wang et al. |
| 6,847,252 | B1 | 1/2005 | Ono et al. |
| 6,858,897 | B2 | 2/2005 | Chen |
| 6,885,210 | B1 | 4/2005 | Suzuki |
| 6,912,155 | B2 | 6/2005 | Sakurai et al. |
| 7,112,978 | B1 | 9/2006 | Koniaris et al. |
| 7,129,745 | B2 * | 10/2006 | Lewis et al. .................... 326/38 |
| 7,180,322 | B1 * | 2/2007 | Koniaris et al. ........ 324/762.01 |
| 7,263,457 | B2 | 8/2007 | White et al. |
| 7,334,198 | B2 * | 2/2008 | Ditzel et al. ..................... 716/1 |
| 7,336,090 | B1 | 2/2008 | Koniaris et al. |
| 7,336,092 | B1 | 2/2008 | Koniaris et al. |
| 7,348,827 | B2 * | 3/2008 | Rahim et al. .................. 327/534 |
| 7,363,176 | B2 | 4/2008 | Patel et al. |
| 7,502,565 | B2 | 3/2009 | Moran |
| 7,626,409 | B1 | 12/2009 | Koniaris et al. |
| 7,671,621 | B2 * | 3/2010 | Koniaris et al. ........ 324/762.09 |
| 2002/0002689 | A1 * | 1/2002 | Yeh ................................ 713/320 |
| 2002/0026597 | A1 | 2/2002 | Dai et al. |
| 2002/0029352 | A1 * | 3/2002 | Borkar et al. ................. 713/320 |
| 2002/0032829 | A1 * | 3/2002 | Dalrymple ....................... 711/5 |
| 2002/0073348 | A1 | 6/2002 | Tani |
| 2002/0083356 | A1 | 6/2002 | Dai |
| 2002/0087896 | A1 | 7/2002 | Cline et al. |
| 2002/0116650 | A1 | 8/2002 | Halepete et al. |
| 2002/0138778 | A1 | 9/2002 | Cole et al. |
| 2002/0178390 | A1 * | 11/2002 | Lee ................................ 713/320 |
| 2002/0194509 | A1 | 12/2002 | Plante et al. |
| 2003/0036876 | A1 | 2/2003 | Fuller et al. |
| 2003/0065960 | A1 | 4/2003 | Rusu et al. |
| 2003/0074591 | A1 | 4/2003 | McClendon et al. |
| 2003/0189465 | A1 | 10/2003 | Abadeer et al. |
| 2004/0025061 | A1 | 2/2004 | Lawrence |
| 2004/0073821 | A1 | 4/2004 | Naveh et al. |
| 2004/0123170 | A1 * | 6/2004 | Tschanz et al. ............... 713/320 |
| 2004/0128631 | A1 * | 7/2004 | Ditzel et al. ..................... 716/2 |
| 2006/0074576 | A1 | 4/2006 | Patel et al. |
| 2007/0229054 | A1 | 10/2007 | Dobberpuhl et al. |
| 2007/0296440 | A1 | 12/2007 | Takamiya et al. |
| 2008/0143372 | A1 | 6/2008 | Koniaris et al. |
| 2010/0077233 | A1 | 3/2010 | Koniaris et al. |
| 2010/0097092 | A1 | 4/2010 | Koniaris et al. |

FOREIGN PATENT DOCUMENTS

| | | |
|---|---|---|
| EP | 0501655 | 2/1992 |
| EP | 0474963 | 3/1992 |
| EP | 0978781 | 9/2000 |
| EP | 1398639 | 12/2003 |
| JP | 409185589 | 7/1997 |
| WO | 0127728 | 4/2001 |

OTHER PUBLICATIONS

"Computer Software", Wikipedia, http://en.wikipedia.org/wiki/software, retrieved May 2, 2007.
Desai, et al., "Sizing of Clock Distribution Networks for High Performance CPU Chips", Digital Equipment Corporation, Hudson, MA, pp. 389-394, 1996.
"High-Speed, Digitally Adjusted Stepdown Controllers for Notebook CPUS", Maxim Manual, pp. 11 & 21.
"Operation U (Refer to Functional Diagram)". LTC 1736, Linear Technology Manual, p. 9.
"Wafer Burn-In Isolation Circuit", IBM Technical Disclosure Bulletin, IBM Corp., New York, US, vol. 32, No. 6B, Nov. 1, 1989, pp. 442-443. XP00073858 ISSN: 0018-8689.
Baker, K. et al., "Wafer Burn-In Isolation Circuit" IBM Technical Disclosure Bulletin, IBM Corp. New York, US, vol. 32, No. 6B, Nov. 1, 1989, pp. 442-443, XP00073858 ISSN: 0018-8689.
Maxim, "High Speed, Digitally Adjusted Step-Down Controllers for Notebook CPUs" 2000 Maxim Integrated Products, 28 pages.
Oner, H. et al., "A Compact Monitoring Circuit for Real-Time On-Chip Diagnosis of Hot-Carrier Induced Degradation", Microelectronics Test Structures, 1997. ICMTS 1997. Proceedings, IEEE International Conference on Monterey, CA Mar. 17, 1997-Mar. 20, 1997, pp. 72-76.
Notice of Allowance, Mail Date Mar. 27, 2005; U.S. Appl. No. 10/956,207.
Notice of Allowance, Mail Date Nov. 1, 2007; U.S. Appl. No. 11/490,356.
Notice of Allowance, Mail Date Jul. 12, 2007; U.S. Appl. No. 11/490,356.
Notice of Allowance, Mail Date Feb. 10, 2009; U.S. Appl. No. 12/037,784.
Notice of Allowance, Mail Date Jan. 29, 2009; U.S. Appl. No. 11/528,031.
Notice of Allowance, Mail Date Jun. 19, 2008; U.S. Appl. No. 11/528,031.
Notice of Allowance, Mail Date Jul. 18, 2007; U.S. Appl. No. 11/512,900.
Notice of Allowance, Mail Date May 15, 2006; U.S. Appl. No. 10/956,217.
Notice of Allowance, Mail Date Nov. 13, 2007; U.S. Appl. No. 11/512,900.
Final Rejection (Office Action), Mail Date Dec. 18, 2008; U.S. Appl. No. 12/037,784.
Non Final Office Action, Mail Date Jul. 14, 2008; U.S. Appl. No. 12/037,784.
Non Final Office Action, Mail Date Oct. 3, 2005; U.S. Appl. No. 10/956,207.
Non Final Office Action, Mail Date Feb. 13, 2008; U.S. Appl. No. 11/528,031.
Non Final Office Action, Mail Date Mar. 14, 2007; U.S. Appl. No. 11/490,356.
Non Final Office Action, Mail Date Sep. 12, 2008; U.S. Appl. No. 11/528,031.
Non Final Office Action, Mail Date Mar. 14, 2007; U.S. Appl. No. 11/512,900.
Non Final Office Action, Mail Date Jan. 30, 2006; U.S. Appl. No. 10/956,217.
Restriction Requirement, Mail Date Oct. 30, 2005; U.S. Appl. No. 10/956,217.
Non-Final Office Action Dated May 19, 2009; U.S. Appl. No. 12/037,784.
Non Final Office Action; Mail Date Sep. 15, 2010; U.S. Appl. No. 12/552,243.

* cited by examiner

BALANCED ADAPTIVE BODY BIAS CONTROL

RELATED APPLICATIONS

This application is a continuation in part of co-pending, commonly owned U.S. patent application Ser. No. 10/334,918, filed Dec. 31, 2002, entitled "Adaptive Power Control" to Burr et al., which is hereby incorporated herein by reference in its entirety.

Commonly-owned U.S. patent application Ser. No. 10/771,015, now U.S. Pat. No. 7,205,758, filed Feb. 2, 2004, entitled "Systems and Methods for Adjusting Threshold Voltage" to Masleid and Burr, is hereby incorporated herein by reference in its entirety.

Commonly-owned U.S. patent application Ser. No. 10/956,207, now U.S. Pat. No. 7,180,322, filed Sep. 30, 2004, entitled "Closed Loop Feedback Control of Integrated Circuits" to Koniaris and Burr, is hereby incorporated herein by reference in its entirety.

Commonly owned U.S. patent application Ser. No. 10/124,152, now U.S. Pat. No. 6,882,172, filed Apr. 16, 2002, entitled "System and Method for Measuring Transistor Leakage Current with a Ring Oscillator" to Suzuki and Burr, is hereby incorporated herein by reference in its entirety.

FIELD OF THE INVENTION

Embodiments in accordance with the present invention relate to control of body bias. More specifically, embodiments in accordance with the present invention relate to balanced adaptive body bias control.

BACKGROUND

In order to operate an integrated circuit, e.g., a microprocessor, in an efficient manner, for example, to consume a low amount of energy to accomplish a task, it is known to adjust various controlling parameters. These parameters may include threshold voltage of active devices of the integrated circuit. It is known to adjust threshold voltage after manufacture of an integrated circuit by adjusting body biasing voltage(s) applied to body biasing wells of such active devices.

SUMMARY OF THE INVENTION

Systems and methods of adaptively controlling body biasing voltages to adjust threshold voltages while balancing characteristics of p type and n type devices are highly desired.

Accordingly, systems and methods of balanced adaptive body bias control are disclosed. In accordance with a first embodiment of the present invention, a method of balanced adaptive body bias control comprises determining a desirable dynamic condition for circuitry of an integrated circuit. A first dynamic indicator corresponding to the desirable dynamic condition is accessed. Second and third dynamic indicators of the integrated circuit are accessed. A first body biasing voltage is adjusted by an increment so as to change the first dynamic indicator in the direction of the desirable dynamic condition. A second body biasing voltage is adjusted based on a relationship between the second dynamic indicator and the third dynamic indicator.

Advantageously, embodiments in accordance with the present invention control two body biasing voltages as two one-dimensional problems, rather than as a two-dimensional problem. This reduces complexity of the control solution from an order two, e.g., quadratic, problem to an order one, e.g., linear, problem, greatly reducing computational resources required to implement such control solutions, while also reducing characterization time and complexity, which simplifies modeling of the control system.

DETAILED DESCRIPTION OF THE INVENTION

Figure 1:
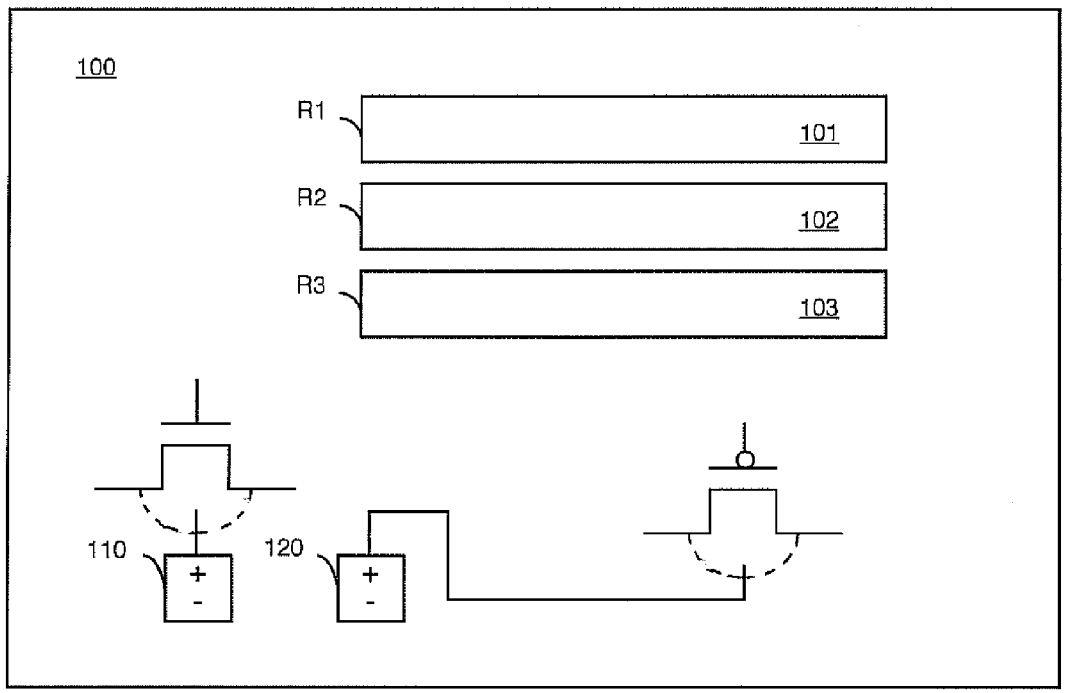
FIG. 1 illustrates an integrated circuit, for example, a microprocessor, comprising dynamic condition reporting registers, in accordance with embodiments of the present invention.

In the following detailed description of the present invention, balanced adaptive body bias control, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions that follow (e.g., process 200) are presented in terms of procedures, steps, logic blocks, processing, and other symbolic representations of operations on data bits that can be performed on computer memory. Such computer memory is functionally coupled to a processor. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. Such quantities may be represented in a wide variety of computer usable media, including, for example, computer memory, e.g., RAM or ROM, removable memory, e.g., flash memory, bubble memory, optical storage, e.g., CD or DVD, magneto-optical storage, magnetic storage, e.g., drum, hard drive, diskette or tape, paper tape, punch cards and the like. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "commanding" or "storing" or "dividing" or "computing" or "testing" or "calculating" or "determining" or "storing'" or "measuring" or "adjusting" or "generating" or "performing" or "comparing" or "synchronizing" or "accessing'" or "retrieving'" or "conveying'" or "sending" or "resuming'" or "installing" or "gathering" or the like, refer to the action and processes of a computer system, or similar electronic computing device" that manipulates and transforms data represented as physical (electronic) quantities within the computer system's registers and memories into other data similarly represented as physical quantities within the computer system memories or registers or other such information storage, transmission or display devices.

Balanced Adaptive Body Bias Control

Embodiments in accordance with the present invention are described in the context of design and operation of integrated semiconductors. More particularly, embodiments of the present invention relate to balanced adaptive body bias control. It is appreciated, however, that elements of the present invention may be utilized in other areas of semiconductor design and operation.

The following description of embodiments in accordance with the present invention is directed toward pFETs (or p-type metal oxide semiconductor field effect transistors (MOSFETS)) formed in surface N-wells and/or nFETs (or n-type MOSFETS) formed in surface P-wells when a p-type substrate and an N-well process are utilized. It is to be appreciated, however, that embodiments in accordance with the present invention are equally applicable to nFETs (e.g., n-type MOSFETS) formed in surface P-wells and/or pFETs (e.g., p-type MOSFETS) formed in surface N-wells when an n-type substrate and a P-well process are utilized. Embodiments in accordance with the present invention are well suited to a variety of types of semiconductors supporting electrically adjustable transistor threshold voltages and such embodiments are considered within the scope of the present invention. Examples of such semiconductors include a fully depleted body structure with back gate electrode separated from the body of a transistor by a buried insulator.

Several operational indicators of an integrated circuit, e.g., a microprocessor, can be measured dynamically, e.g., in-situ, while the integrated circuit is in operation. For example, the operating temperature of the integrated circuit can be measured. Such measurements can be external, e.g., via an applied thermocouple, or they can be made internally, e.g., via on-chip measurement circuits.

A wide variety of integrated circuit characteristics can be measured or determined, either directly or inferred from other characteristics, while the device is operating. For example, in addition to temperature, other characteristics such as gate delays, metal delays, leakage current, "on" current, relative behavior of NMOS and PMOS devices, maximum frequency and the like can be measured or determined for the instant operating conditions of an integrated circuit. Commonly owned U.S. patent application Ser. No. 10/124,152, now U.S. Pat. No. 6,882,172, filed Apr. 16, 2002, entitled "System and Method for Measuring Transistor Leakage Current with a Ring Oscillator" and incorporated by reference herein, provides exemplary systems and methods of such dynamic determinations, or dynamic operating indicators, that are well suited to embodiments in accordance with the present invention.

Such measurements or indications are typically made available, e.g., to control circuitry, state machines and/or processor control software, via registers. Such register values frequently comprise a count of a number of events, e.g., oscillations of a ring oscillator in a given time interval. For the purpose of illustrating embodiments in accordance with the present invention, a model of a register reporting a value that is correlated to an operating characteristic of an integrated circuit is employed. It is to be appreciated, however, that embodiments in accordance with the present invention are well suited to a variety of systems and methods of determining and reporting dynamic operating conditions of an integrated circuit.

FIG. 1 illustrates an integrated circuit 100, for example, a microprocessor, comprising dynamic condition reporting registers, in accordance with embodiments of the present invention.

Dynamic condition reporting registers R1 101, R2 102 and R3 103 each indicate a dynamic condition metric of integrated circuit 100. For example, generally each dynamic condition reporting register is associated with a dynamic condition measuring circuit either as a part of the integrated circuit or external to the integrated circuit. Conversion of a measured quantity, e.g., oscillations of a ring oscillator, into a usable metric related to the measured quantity, e.g., a frequency measurement, e.g., in hertz, or a count of oscillations per unit time, can be embodied in either software or hardware, and all such embodiments are to be considered within the scope of the present invention. For example, logic circuitry can increment a counting register for each oscillation for a period of time. Alternatively, for example, a software timing loop, with or without hardware timing assistance, can count a number of oscillations per unit time. In accordance with embodiments of the present invention, dynamic condition reporting registers, e.g., dynamic condition reporting registers R1 101, R2 102 and R3 103, can refer to any memory location utilized to store such indications of a dynamic condition.

As operating conditions of integrated circuit 100 change, values reported by dynamic condition reporting registers R1 101, R2 102 and R3 103 will generally change. For example, operating voltage and operating temperature are strong influences on gate delay and/or leakage current within an integrated circuit. Likewise, body biasing voltage(s) applied to circuitry of integrated circuit 100 also strongly influence operating conditions such as gate delay and/or leakage current. As body biasing voltage(s) applied to circuitry of integrated circuit 100 vary, so too in general will the values reported by dynamic condition reporting registers R1 101, R2 102 and R3 103.

For example, dynamic condition reporting register R1 101 can indicate a number of oscillations per time of a ring oscillator comprising complementary metal oxide inverter gates. Such a circuit can be utilized to indicate gate delays for the microprocessor at the instant operating conditions, e.g., operating temperature, operating voltage, applied body biasing voltage(s) and the like. Similarly, other dynamic condition reporting registers can indicate other operational characteristics of integrated circuit 100. For example, device leakage, gate leakage, temperature, metal delays, "on" current, behavior of n type and p type devices and/or relative behavior of n type and p type devices can be reported by dynamic condition reporting registers.

Most useful dynamic conditions indications will have a correlation with maximum achievable operating frequency of an integrated circuit at those operating conditions. For example, an indication of operating temperature will generally have a correlation with maximum achievable operating frequency. For example, for operation above a thermal null voltage, as operating temperature increases, maximum achievable operating frequency decreases. Other dynamic condition indications may have other correlations with maximum achievable operating frequency. For example, the number of oscillations of a ring oscillator per unit time may generally increase as maximum achievable operating frequency of an integrated circuit increases.

Integrated circuit 100 further comprises adjustable body biasing voltage sources 110 and 120. For example, adjustable body biasing voltage source 110 is configured to supply a body biasing voltage to n type body wells of p type metal oxide semiconductors (PMOS). Similarly, adjustable body biasing voltage source 120 is configured to supply a body biasing voltage to p type body wells of n type metal oxide semiconductors (NMOS). It is to be appreciated that embodiments in accordance with the present invention are not dependent upon the location of such body biasing voltage sources, and are well suited to body biasing voltages applied to integrated circuit 100 from external sources, e.g., voltage supplies external to integrated circuit 100.

Figure 2:
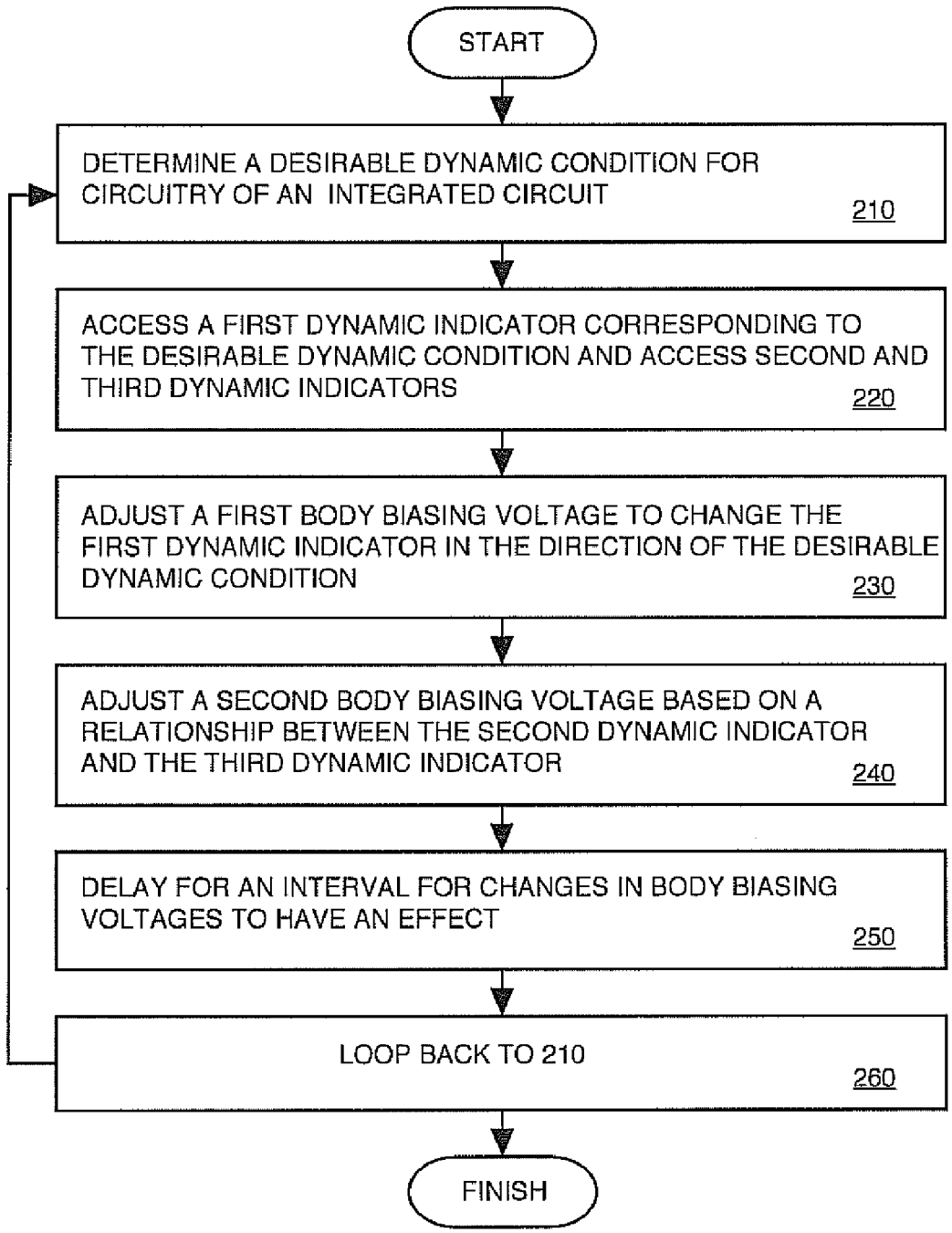
FIG. 2 illustrates an exemplary computer controlled method of balanced adaptive body bias control, in accordance with embodiments of the present invention.

FIG. 2 illustrates an exemplary computer controlled method 200 of balanced adaptive body bias control, in accordance with embodiments of the present invention. In 210, a desirable dynamic condition for circuitry of an integrated circuit is determined. For example, software operating on a microprocessor may determine an operating frequency necessary to perform a particular task on the microprocessor. A desirable gate delay for circuitry of the microprocessor corresponding to such desirable operating frequency can be determined, e.g., via table lookup. Similarly, a desirable power condition of the integrated circuit can be determined.

In 220, a first dynamic indicator corresponding to the desirable dynamic condition, second and third dynamic indicators are accessed. For example, a second dynamic indicator can indicate leakage current of PMOS devices of the integrated circuit and a third dynamic indicator can indicate leakage current of NMOS devices of the integrated circuit. For example, dynamic condition reporting registers R1 101, R2 102 and R3 103 (FIG. 1) are accessed. Embodiments of the present invention are well suited to measurements of such dynamics indicators taking place prior to or during method 200.

In 230, a first body biasing voltage is adjusted to change the first dynamic indicator in the direction of the desirable dynamic condition. For example, if a measured gate delay is larger than a desirable gate delay, the first body biasing voltage can be decreased.

In general, the speed of operation of circuitry of an integrated circuit, e.g., maximum frequency of operation, is more sensitive to one transistor type, typically NMOS, while circuit leakage is more sensitive to the other transistor type, typically PMOS. A determination of which body biasing voltage to adjust first, e.g., in 230, should correspond to which body biasing voltage has a greater effect on the desirable dynamic condition. For example, if the desirable dynamic condition is maximum frequency of operation, body biasing voltage applied to NMOS devices, e.g., a p well voltage, should be adjusted first.

In 240, a second body biasing voltage is adjusted based on a relationship between the second dynamic indicator and the third dynamic indicator.

In accordance with embodiments of the present invention, it is not necessary to specify a particular body biasing voltage to a body biasing voltage supply. Rather, method 200 can signal such body biasing voltage supply to increase or decrease the particular body biasing voltage relative to a previous condition of the body biasing voltage. Generally, such relative changes are beneficially less computationally intense than determining an absolute value for a body biasing voltage. In accordance with an embodiment of the present invention, the relative adjustment in body biasing voltage (230, 240) may be the minimum increment of adjustment available from the body biasing voltage supplies, e.g., adjustable body biasing voltage sources 110 and 120 of FIG. 1. An exemplary value of such minimum increments or step sizes is 20 mV. It is to be appreciated, however, that embodiments in accordance with the present invention are well suited to determining an absolute value, e.g., via table lookup, for a body biasing voltage based on a desirable adjustment to a dynamic indicator.

Relation 1, below, illustrates an exemplary relationship between a second dynamic indicator and a third dynamic indicator:

$$|(Ioffn - scale * Ioffp)| \quad \text{(Relation 1)}$$

where Ioffn is a dynamic indication of leakage current of n type devices, Ioffp is a dynamic indication of leakage current of p type devices, scale is a scaling factor and "|" indicates the absolute value operation.

The scaling factor used within Relation 1 can be used to adjust for variations between n type and p type devices within an integrated circuit. For example, n type devices are typically faster than p type devices, and may generally be designed to have less leakage current for a given maximum frequency of operation in comparison to p type devices. For example, such a scaling factor can be used to adjust for such variations in leakage current. It is appreciated that the scaling factor need not be linear and may be unity.

In accordance with one embodiment of the present invention, the second body biasing voltage is adjusted so as to minimize a value of Relation 1. For example, the second body biasing voltage is adjusted a minimum increment in a direction, e.g., increased or decreased, so as to minimize a value of Relation 1.

It is to be appreciated that other relationships among dynamic indicators may be used in 240, in accordance with embodiments of the present invention. For example, a quadratic relationship is well suited to embodiments of the present invention.

In optional 250, an interval, e.g., a settling delay, is delayed for changes in body biasing voltages to have an effect. An exemplary delay might be ten microseconds. In optional 260, control reverts to 210 and the method repeats.

It is to be appreciated that virtually any measurable dynamic condition, as well as relationships among such measurable dynamic conditions, can be used as the second and third dynamic indicators in method 200, in accordance with embodiments of the present invention. In addition to the previously described leakage currents, e.g., "off" currents, for example, "on" currents, gate delays by transistor type, combinations, e.g., ratios of "on" current to "off" current by transistor type and the like may be utilized as such second and third dynamic indicators, and are well suited to embodiments of the present invention.

Similarly, it is to be appreciated that virtually any measurable dynamic condition, as well as relationships among such measurable dynamic conditions, can be used as the desirable dynamic condition. In addition to the previously described gate delays and maximum operating frequency, for example, "on" currents, gate delays by transistor type, combinations, e.g., ratios of "on" current to "off" current by transistor type, power consumption, chip temperature, wire-dominated delays, critical path replicas and the like may be utilized as the desirable dynamic condition, and are well suited to embodiments of the present invention.

Advantageously, embodiments in accordance with the present invention are capable of controlling two body biasing voltages as two one-dimensional problems, rather than as a two-dimensional problem. This reduces complexity of the control solution from an order two, e.g., quadratic, problem to an order one, e.g., linear, problem, greatly reducing computational resources required to implement such control solutions.

Embodiments in accordance with the present invention thus provide systems and methods of adaptively controlling body biasing voltages to adjust threshold voltages while balancing characteristics of p type and n type devices.

Embodiments in accordance with the present invention, balanced adaptive body bias control, are thus described. While the present invention has been described in particular embodiments, it should be appreciated that the present invention should not be construed as limited by such embodiments, but rather construed according to the below claims.

What is claimed is:

1. A method comprising:
   determining a desirable dynamic condition for a circuit of an integrated circuit, wherein the circuit receives a first and a second body biasing voltages;
   accessing a first dynamic indicator of the circuit corresponding to the desirable dynamic condition;
   accessing second and third dynamic indicators of the circuit;
   adjusting the first body biasing voltage to change the first dynamic indicator in the direction of the desirable dynamic condition; and
   adjusting the second body biasing voltage based on a relationship between the second dynamic indicator and the third dynamic indicator.

2. The method of claim 1 wherein the relationship comprises a difference between the second dynamic indicator and a scaled value of the third dynamic indicator and further wherein the adjusting acts to minimize the difference.

3. The method of claim 1 wherein the desirable dynamic condition corresponds to a desirable operating frequency for the integrated circuit.

4. The method of claim 1 wherein the first dynamic indicator corresponds to a gate delay of circuitry of the integrated circuit.

5. The method of claim 1 wherein the first dynamic indicator corresponds to on current of active devices of the integrated circuit.

6. The method of claim 1 wherein the second dynamic indicator corresponds to leakage current of a first polarity of active devices of the integrated circuit.

7. The method of claim 6 wherein the third dynamic indicator corresponds to leakage current of active devices of a second polarity opposite to the first polarity.

8. The method of claim 1 wherein the first dynamic indicator corresponds to a critical path replica of the integrated circuit.

9. The method of claim 1 further comprising delaying an interval for changes in body biasing voltages to have an effect.

10. The method of claim 1 further comprising repeating the determining, the accessing the first dynamic indicator, the accessing the second and third dynamic indicators, the adjusting the first body biasing voltage and the adjusting the second body biasing voltage.

11. The method of claim 1 wherein the accessing the first dynamic indicator comprises accessing a register value corresponding to the first dynamic indicator.

12. The method of claim 1 wherein the adjusting the first body biasing voltage by an increment comprises adjusting the first body biasing voltage by a minimum increment of adjustment available from a body biasing voltage supply.

13. The method of claim 1 wherein the integrated circuit is a microprocessor.

14. The method of claim 1 wherein the first body biasing voltage has a greater effect on the desirable dynamic condition than the second body biasing voltage.

15. A computer system comprising:
   a microprocessor integrated circuit;
   first and second body biasing voltage supplies coupled to the microprocessor integrated circuit for furnishing selectable voltages to first and second body biasing wells of the microprocessor integrated circuit;
   a memory space coupled to the microprocessor integrated circuit and comprising instructions to implement a method of balanced adaptive body bias control comprising:
   determining a desirable dynamic condition for circuitry of the microprocessor integrated circuit;
   accessing a first dynamic indicator corresponding to the desirable dynamic condition;
   accessing second and third dynamic indicators of the integrated circuit;
   adjusting the first body biasing voltage supply to change the first dynamic indicator in the direction of the desirable dynamic condition; and
   adjusting the second body biasing voltage supply based on a relationship between the second dynamic indicator and the third dynamic indicator.

16. The system of claim 15 wherein the desirable dynamic condition corresponds to a desirable operating frequency for the microprocessor integrated circuit.

17. The system of claim 16 wherein the first dynamic indicator corresponds to a gate delay of circuitry of the microprocessor integrated circuit.

18. The system of claim 15 wherein the accessing the first dynamic indicator comprises accessing a register value in an address space of the microprocessor integrated circuit corresponding to the first dynamic indicator.

19. The system of claim 15 wherein the adjusting the first body biasing voltage supply by an increment comprises adjusting the first body biasing voltage supply by a minimum increment of adjustment available from the first body biasing voltage supply.

20. The system of claim 15 wherein the first body biasing voltage has a greater effect on the desirable dynamic condition than the second body biasing voltage.

21. An article of manufacture including a computer usable media comprising instructions stored thereon that, responsive to execution on a computing device, cause the computing device to perform operations comprising:
   determining a desirable dynamic condition for circuitry of an integrated circuit;
   accessing a first dynamic indicator corresponding to the desirable dynamic condition;
   accessing second and third dynamic indicators of the integrated circuit;
   adjusting a first body biasing voltage so as to change the first dynamic indicator in the direction of the desirable dynamic condition; and
   adjusting a second body biasing voltage based on a relationship between the second dynamic indicator and the third dynamic indicator.

22. The article of manufacture of claim 21 wherein the desirable dynamic condition corresponds to a desirable operating frequency for the integrated circuit.

23. The article of manufacture of claim 21 wherein the first dynamic indicator corresponds to a gate delay of circuitry of the integrated circuit.

24. The article of manufacture of claim 21 wherein the accessing the first dynamic indicator comprises accessing a register value corresponding to the first dynamic indicator.

25. The article of manufacture of claim 21 wherein the adjusting the first body biasing voltage comprises adjusting the first body biasing voltage by a minimum increment of adjustment available from a body biasing voltage supply.

26. A method comprising:
 determining a desirable dynamic condition for a circuit of an integrated circuit, wherein the circuit receives a first well and a second well body biasing voltages;
 accessing a first dynamic indicator of the circuit corresponding to the desirable dynamic condition;
 accessing second and third dynamic indicators of the circuit;
 adjusting the first well body biasing voltage to change the first dynamic indicator in the direction of the desirable dynamic condition; and
 adjusting the second well body biasing voltage based on a relationship between the second dynamic indicator and the third dynamic indicator.

27. The method of claim 26 wherein the relationship comprises a difference between the second dynamic indicator and a non-unity scaled value of the third dynamic indicator and further wherein the adjusting acts to minimize the difference.

28. The method of claim 26 wherein the desirable dynamic condition corresponds to a desirable operating frequency for the integrated circuit.

29. The method of claim 26 wherein the first dynamic indicator corresponds to a gate delay of circuitry of the integrated circuit.

30. The method of claim 26 wherein the first dynamic indicator corresponds to on current of active devices of the integrated circuit.

31. The method of claim 26 wherein the second dynamic indicator corresponds to leakage current of a first polarity of active devices of the integrated circuit.

32. The method of claim 31 wherein the third dynamic indicator corresponds to leakage current of active devices of a second polarity opposite to the first polarity.

33. An integrated circuit comprising:
 means for determining a desirable dynamic condition for a circuit of the integrated circuit, wherein the circuit receives a first well and a second well body biasing voltages;
 means for accessing a first dynamic indicator of the circuit corresponding to the desirable dynamic condition;
 means for accessing second and third dynamic indicators of the circuit;
 means for adjusting the first body biasing voltage to change the first dynamic indicator in the direction of the desirable dynamic condition; and
 means for adjusting the second body biasing voltage based on a relationship between the second dynamic indicator and the third dynamic indicator.

34. The integrated circuit of claim 33 wherein the first dynamic indicator corresponds to a critical path replica of the integrated circuit.

35. The integrated circuit of claim 33 further comprising delaying an interval for changes in body biasing voltages to have an effect.

36. The integrated circuit of claim 33 further comprising means for repeating the determining, the accessing the first dynamic indicator, the accessing the second and the third dynamic indicators, the adjusting the first body biasing voltage and the adjusting the second body biasing voltage.

37. The integrated circuit of claim 33 wherein the means for accessing the first dynamic indicator comprises accessing a register value corresponding to the first dynamic indicator.

38. The integrated circuit of claim 33 wherein the means for adjusting the first body biasing voltage by an increment comprises adjusting the first well body biasing voltage by a minimum increment of adjustment available from a body biasing voltage supply.

39. The integrated circuit of claim 33 wherein the integrated circuit is a microprocessor.

40. The integrated circuit of claim 33 wherein the first well body biasing voltage has a greater effect on the desirable dynamic condition than the second well body biasing voltage.

* * * * *